Figure 10:
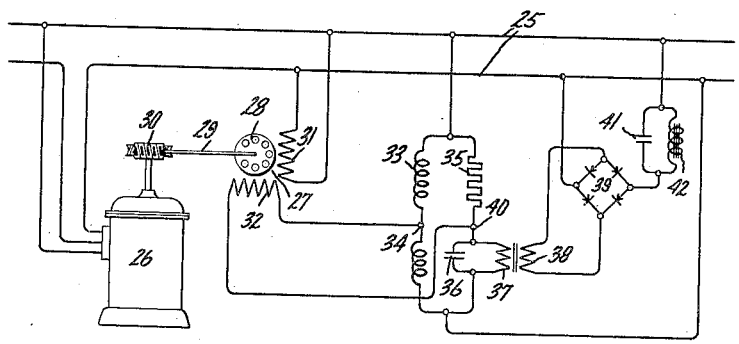

May 12, 1936.  A. BOYAJIAN  2,040,684
ELECTRIC CIRCUIT CONTROL MEANS
Filed Dec. 23, 1932   2 Sheets-Sheet 1
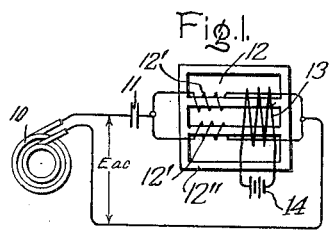
Fig.1.
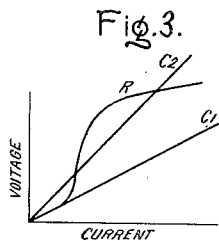
Fig.3.
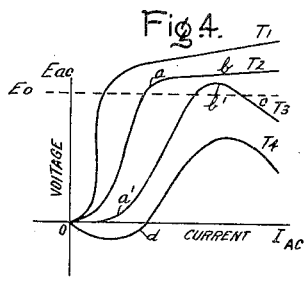
Fig.4.
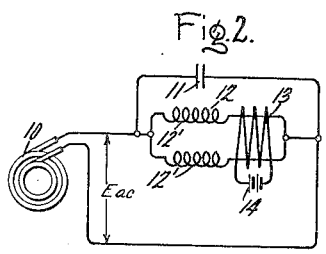
Fig.2.
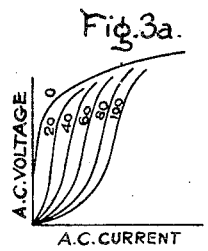
Fig.3a.
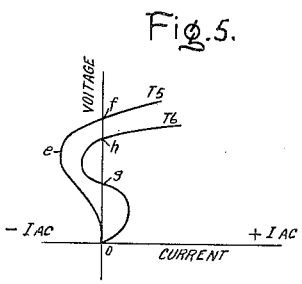
Fig.5.
Fig.3b.
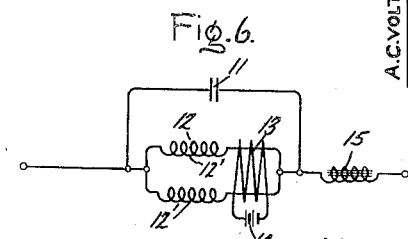
Fig.6.
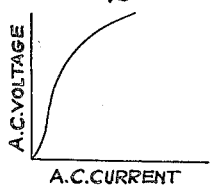
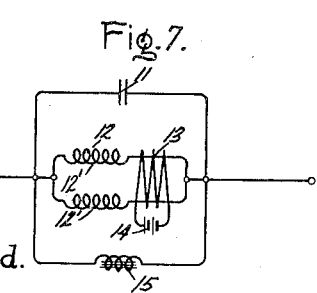
Fig.7.
Fig.3c.    Fig.3d.
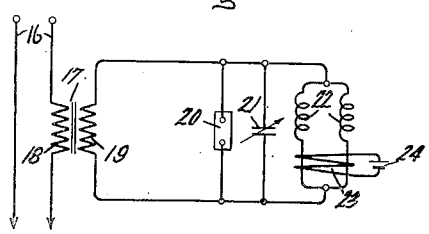
Fig.8.
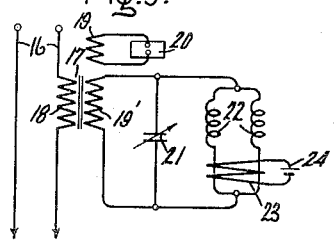
Fig.9.
Inventor:
Aram Boyajian,
by Charles N. Tullar
His Attorney.

Inventor:
Aram Boyajian,
by Charles E. Tullar
His Attorney.

Patented May 12, 1936

2,040,684

UNITED STATES PATENT OFFICE 2,040,684

ELECTRIC CIRCUIT CONTROL MEANS

Aram Boyajian, Pittsfield, Mass., assignor to General Electric Company, a corporation of New York Application December 23, 1932, Serial No. 648,642

22 Claims. (Cl. 171—119)

My invention relates to electric circuit control means and more particularly to electric circuit control means of the alternating current type including circuit elements having non-linear volt-ampere characteristics.

Various investigators have made theoretical studies of the resultant volt-ampere characteristics of combinations of circuit elements in which a capacitance is combined with an inductance having a closed iron core which is designed to saturate magnetically by the circuit current. Circuits of this type are with few exceptions distinguished by non-linear volt-ampere characteristics. Throughout the specification and claims, "non-linear" element or circuit will be used to designate an element, circuit, or branch circuit having a non-linear volt-ampere characteristic for effective values of alternating current.

The non-linear element of the type of circuit referred to above has usually been an iron-core inductance of the self-saturating type, for example, a reactor in which magnetic saturation of the core is caused primarily by the alternating current flowing through the reactor winding. Saturable inductances of this type tend to wave distortion, yielding harmonics in the current wave with sinusoidal voltage or harmonics in the voltage wave with sinusoidal current. Such distortion is intensified with increasing alternating current saturation in inductances with ferromagnetic cores. However, I have discovered that if a desired large reactive current is caused to flow as a consequence of direct-current excitation of the core, wave distortion is far less than if the same reactive current is caused to flow by sufficiently increased alternating voltage. In general for the range of commercial alternating flux densities the wave-shape of the current improves with increase in the direct-current excitation over a wide range. As a consequence of the improvement in wave-form the percentage utilization of the capacitance, in circuits of the type previously mentioned, is more complete, and total characteristics are obtained for the combination of a biased reactor and capacitance which cannot be obtained when a self-saturating reactor is used. Furthermore, with a biased reactor circuits of the non-linear type exhibit better power factor, great adjustability and greater sensitivity. Accordingly, in carrying out my invention I utilize an inductance provided with a ferromagnetic core in which independent or unidirectional fluxes are produced. This type of inductance in the specification and claims will be designated as a biased saturable inductance in contradistinction to a self-saturating inductance.

It is an object of my invention to provide an improved circuit control device.

It is another object of my invention to provide a new and improved combination of circuit impedances including a biased saturable inductance.

It is a further object of my invention to provide new and improved circuit control means including a capacitance, and a biased saturable inductance having a non-linear volt-ampere characteristic.

It is a still further object of my invention to provide new and improved circuit control means of the non-linear type including a biased saturable inductance in which distortion in wave-form of the voltage across the inductance is substantially a minimum.

It is another object of my invention to provide a new and improved combination of a capacitance having a linear volt-ampere characteristic and a biased saturable inductance having a non-linear volt-ampere characteristic which provides a constant alternating voltage of substantially sinusoidal wave-shape with a variable sinusoidal alternating voltage impressed upon the circuit.

In accordance with one embodiment of my invention a circuit element, such as a capacitance, having a linear volt-ampere characteristic is connected in circuit with a saturable inductance provided with a constant magnetic bias. The volt-ampere characteristics of the several elements are so correlated for a predetermined range of applied voltage as to obtain a total non-linear volt-ampere characteristic which exhibits novel and useful properties for the control and regulation of electric circuits and dynamo-electric machines. In accordance with another embodiment of my invention the magnetic bias of the saturable inductance is varied in accordance with variations in the alternating current therethrough to maintain a constant ratio between the direct current and the alternating current of the inductance whereby the capacitance used in combination therewith may be reduced, and in certain cases if the ratio is properly chosen may be eliminated, to obtain a non-linear volt-ampere characteristic similar to the combination of the constant-bias saturable inductance and the capacitance.

My invention will be better understood from the following description taken in connection with the accompanying drawings and its scope will be pointed out in the appended claims.

Figure 11:
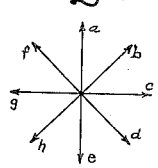
Figure 12:
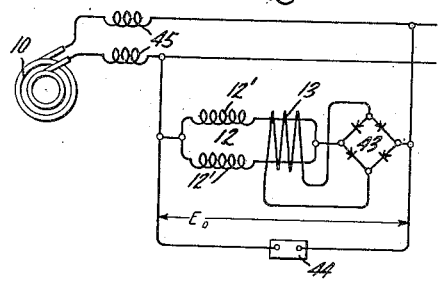
Figure 13:
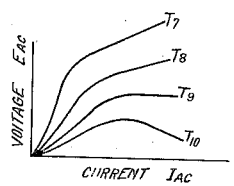
Figure 14:
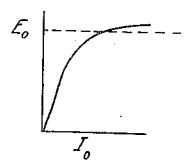
Figure 15:
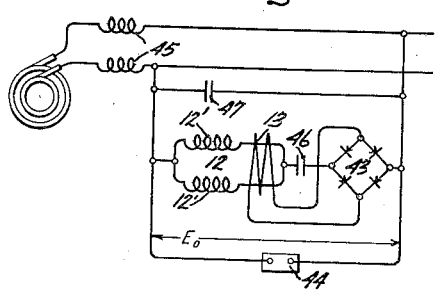
Figure 16:
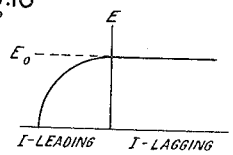
Figure 17:
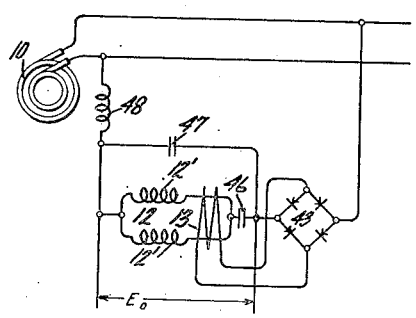

In the drawings, Fig. 1 is a diagrammatic representation of a combination of a capacitance element having a linear volt-ampere characteristic and a fixed-bias saturable inductance element, arranged in series relation; Fig. 2 is a diagrammatic representation of the same elements in parallel relation; Fig. 3 is an explanatory diagram showing the volt-ampere characteristic of the different circuit elements severally; Figs. 3a and 3b are explanatory diagrams showing comparative volt-ampere characteristics of self-saturating and biased reactors; Figs. 3c and 3d are explanatory diagrams showing comparative current waves between a self-saturating reactor and a biased reactor; Figs. 4 and 5 are explanatory diagrams showing the volt-ampere characteristics of the series and parallel combinations respectively for different values of the capacitance element; Figs. 6 and 7 are diagrammatic illustrations of an embodiment of my invention in a simple series and parallel circuit, respectively, with a self-saturating reactor; Figs. 8 and 9 are diagrammatic illustrations of an embodiment of my invention as applied in current transformer circuits; Fig. 10 is a diagrammatic illustration of an embodiment of my invention in a voltage regulating system; Fig. 11 is a diagram for explaining the operation of the arrangement illustrated in Fig. 10; Fig. 12 is an explanatory elementary diagram of a circuit in which the ratio between the direct current and alternating current of a saturable reactor is maintained constant; Figs. 13 and 14 are explanatory diagrams of volt-ampere characteristics of the circuit shown in Fig. 12 for different ratios between the direct and alternating current of the reactor; Fig. 15 is an elementary diagram of an embodiment of my invention with variable direct current bias in a regulating system; Fig. 16 is an explanatory diagram for the circuit shown in Fig. 15; and Fig. 17 is a modification of the arrangement illustrated in Fig. 15.

While, in general, especially in the ranges proposed for practical use, the harmonics are relatively small, and the shape of the characteristic curve is substantially the same for the fundamental frequency component of the total current or voltage as for the total current or voltage itself, yet, in certain other ranges, the characteristic curve for the fundamental frequency component may be considerably different from that of the total current or voltage. In the specification and drawings, therefore, it is intended that the characteristic curves given represent primarily the fundamental frequency component of the current or voltage when this is different from that of the total current or voltage.

It is further recognized that inductive reactors may have appreciable power losses, represented by in-phase components in their currents or voltages. These components are also usually small and do not modify appreciably the shape of the characteristic curves. However, the characteristic curves, discussed hereinafter, represent strictly the wattless components of the current and voltage.

Referring to Fig. 1 of the drawings, 10 indicates a source of alternating current connected to energize in series relation a capacitance 11 and a saturable inductance 12 having a fixed direct-current bias and comprising alternating-current windings 12′ and a saturating winding 13 connected to be energized from a source of direct current 14. The inductance element 12 may comprise various constructions known in the art, such for example as has been employed in certain types of reactors in which a four-legged core is provided. This is the diagrammatic form illustrated in Fig. 1 and it is to be understood that this form is illustrative of a suitable form for the similar biased saturable reactors schematically indicated in the remaining figures. In the diagrammatic form illustrated in Fig. 1 the respective alternating current windings 12′ are wound in opposite directions and are placed on the two inner legs of a four-legged core structure 12″. The single saturating winding 13 is wound so as to surround both inner legs as shown in Fig. 1 and similarly indicated in the remaining figures of the drawings. Various other known arrangements may be used, such as the well known three-legged type, where the alternating current windings are wound on the outer legs and connected in parallel relation and the saturating winding is placed on the middle leg. Whatever form of biased reactor is employed in carrying out my invention, it is preferable to use some form in which the direct current circuit is protected from induced alternating voltages or currents of both the fundamental component of current or voltage and harmonic components of current or voltage.

In Fig. 2 of the drawings the same impedance elements are connected to be energized in parallel relation from the source 10.

If the bias or direct-current excitation of the inductance 12 is unchanged during the application of gradually increasing alternating voltage to the windings 12′, a non-linear volt-ampere characteristic similar to curve R in Fig. 3 is obtained. Similarly, if the alternating voltage is applied to the capacitance unit 11, linear volt-ampere characteristics will be obtained such as are illustrated by curves $C_1$ and $C_2$; the characteristics being of different slopes depending upon the magnitude of the particular capacitance in the circuit.

Fig. 3a shows volt-ampere characteristics of a saturable reactor of the four-legged type schematically illustrated in the drawings with simultaneous direct current and alternating current excitation. The volt-ampere curve for combined D. C.-A. C. excitation has two bends—one at the lower densities and the other at the higher densities. The volt-ampere curve for pure A. C. has also two such bends but since the lower bend occurs at extremely low core densities and small values of current, it does not show in the usual curves drawn for the working range of current and voltage. If the initial portion of the A. C. volt-ampere curve for zero D. C. is drawn to a larger scale, it looks as shown in Fig. 3b, exposing the lower bend. By reference to Fig. 3a, it will be evident that the addition of D. C. excitation indicated by the numerals on each curve does not introduce a new bend to the curve but shifts the two bends of the A. C. volt-ampere curve far towards the higher values of current and voltage and this fact makes it possible to correlate the volt-ampere characteristic of the biased reactor with the volt-ampere characteristic of a given capacitor to obtain the various total characteristics utilized in carrying out my invention.

Figs. 3c and 3d indicate very generally the improvement in wave form which may be obtained with a biased reactor as compared with a simple self-saturating reactor. Normally the wave shape of the exciting current of a simple closed core reactor departs considerably from a sine wave, when sine wave voltage is applied to it. Fig. 3c is a copy of an oscillogram showing the current wave of a simple self-saturating reactor. Fig. 3d is a copy of an oscillogram showing the current wave of a reactor of the four-legged type with D. C. bias raised to 80% of the A. C. excitation. It will be noted that the wave is still slightly distorted at the intersection with the axis. The excellence of the wave shape depends upon the ratio of the D. C. excitation to the A. C. excitation. Whether a wave shape is to be considered good or bad depends on the basis of comparison. In the present invention the basis of comparison is between the biased reactor and the self-saturating reactor.

In Fig. 4, I have diagrammatically illustrated the combined volt-ampere characteristics of the series connected inductance 12 with a fixed bias and the capacitor 11 with the volt-ampere characteristics of the several elements correlated in accordance with my invention, with applied voltage $E_{ac}$ as ordinates and current $I_{ac}$ as abscissae. For relatively small values of series capacitive reactance, the characteristic curve is of the shape $T_1$. With increasing values of capacitive reactance the characteristic curves assume the forms $T_2$, $T_3$ and $T_4$. Curve $T_2$ is of particular interest in its horizontal zone $a$—$b$, in that an inappreciable change in voltage produces a large change in current. Curve $T_3$ is of interest with a long zero zone $o$—$a'$, and a dropping zone $b'$—$c$. It is to be noted that there is a plurality of current values for the voltage $E_0$. The dropping zone leads to instability and to the so-called "jumping" phenomenon in circuits of this type. Curve $T_4$, in addition to showing a plurality of current values for a given voltage over a wide range, crosses the current axis at the point $d$, yielding a leading power factor for currents less than $d$, and a lagging power factor for currents greater than $d$.

In Fig. 5, I have diagrammatically illustrated the combined volt-ampere characteristics of the parallel connected inductance 12 with a fixed bias and the capacitor 11 correlated in accordance with my invention, with the applied voltage $E_{ac}$ as ordinates, lagging current $+I_{ac}$ as positive abscissae, and leading current $-I_{ac}$ as negative abscissae. If one takes, for example, a biased reactor having a volt-ampere characteristic represented by curve R of Fig. 3 and connects it in parallel with a capacitor having the volt-ampere characteristic represented by curve $C_1$ of Fig. 3 there is obtained a volt-ampere characteristic for the circuit as illustrated by curve $T_5$ of Fig. 5. It will be seen that in the zone $o$—$e$ the network behaves like a capacitance having a non-linear volt-ampere characteristic and more particularly like a "saturating capacitance". In the zone $e$—$f$ the network still behaves like a capacitance for the total actual current but as an inductance for increments in the current. At the point $f$ the phase of the current reverses from leading to lagging. If one substitutes a capacitor in the circuit of Fig. 2 having a volt-ampere characteristic represented by curve $C_2$ of Fig. 3 there is obtained a volt-ampere characteristic for the circuit as illustrated by curve $T_6$ which shows zero current and infinite impedance at two different voltages, namely $g$ and $h$, passing from lagging to leading and again to lagging at the respective points designated.

Figs. 6 and 7 diagrammatically illustrate one general use of my saturating capacitance having the characteristic as illustrated by curve $T_5$ of Fig. 5. Fig. 6 shows the network of Fig. 2 utilized to neutralize a saturable inductance 15 in series relation therewith, and Fig. 7 shows the network of Fig. 2 utilized to neutralize the saturable inductance 15 connected in parallel relation therewith.

Fig. 8 diagrammatically illustrates an application of my saturating capacitance for improving the operation of a current transformer whereby the current ratio and phase displacement may be maintained sensibly constant with a variable burden connected to the secondary winding of the transformer. An alternating-current circuit is represented by the conductors 16. A current transformer 17 has a primary winding 18 connected in series relation with the circuit 16 and a secondary winding 19 connected to energize the useful burden 20 which is very diagrammatically illustrated by a square outline. In parallel relation with the burden 20 I connect the saturating capacitance comprising a capacitor 21 and a biased saturable reactor having alternating current windings 22 and a saturating winding 23 connected to be energized from a source of direct current 24. The capacitor 21 may be made adjustable in order to adjust the desired degree of saturation of reactor 22 to be consistent with that of the magnetizing current of the transformer 17.

Fig. 9 diagrammatically illustrates a modification of the arrangement illustrated in Fig. 6, in which the current transformer 17 is provided with a primary winding 18 connected in series relation with the circuit 16 and two secondary windings 19 and 19' connected respectively to the burden 20 and the saturating capacitance network.

In the simple current transformer, as illustrated in Fig. 8 without the compensating means, the ratio of transformation usually varies from that of the turn ratio due to the magnetizing current of the transformer. The magnetizing current also causes a departure from the 180° phase relation between the primary and secondary currents. These deviations increase with increasing saturation of the transformer core, and as adequate means have not been known in the past to compensate for saturating magnetizing currents it has become customary to design current transformers for very low densities. However, for those applications in which the harmonics and power components of exciting current are not objectionable, as in certain relay applications, it now becomes feasible to design current transformers for reasonably high densities with greatly improved accuracy. In accordance with my invention, as illustrated in Figs. 8 and 9, the error in ratio and phase angle introduced by the saturating magnetizing current is substantially eliminated by the saturating capacitor network which is characterized simultaneously by leading power factor and saturation with increasing voltage as described in more detail in the consideration of curve $T_5$ in Fig. 5.

In Fig. 10, I have illustrated an embodiment of my invention in a voltage regulating system. By way of example, I have shown a circuit 25 which is to be controlled by regulating means shown as an induction regulator 26 which is provided with a reversible motor 27 for operating the rotor of the regulator in a manner to introduce a voltage component to increase or decrease the supply voltage for regulating the load voltage on the circuit 25. The motor 27 is illustrated as a two-phase motor having a squirrel cage rotor 28 connected through a shaft 29 and suitable gearing 30 to the rotor of the regulator. The stator winding of the motor comprises one phase winding 31 connected directly to the circuit 25 and another phase winding 32 connected through a phase shifting network arranged in the form of a Wheatstone bridge which is connected to be energized from the circuit 25. The phase shifting network includes a reactor or auto transformer 33 provided with a mid-tap 34. A resistor 35 is arranged in series relation with a non-linear parallel circuit, similar to the arrangement illustrated in Fig. 2, comprising a capacitor 36 and a biased saturable reactor 37, connected in series relation with resistor 35 across the outer terminals of the reactor 33. The reactor 37 is provided with a saturating winding 38 which is connected to be energized through a suitable rectifier 39 from the circuit 25, or any other circuit which is normally designated as a constant potential supply. The motor phase winding 32 is connected to the mid-tap 34 of the reactor 33 and to the junction point 40 between the resistor 35 and capacitor 36.

The sensitivity of the arrangement may be greatly increased by adding a parallel connected capacitor 41 and saturable reactor 42 in series relation with the alternating current circuit of the rectifier 39.

The operation of the arrangement illustrated in Fig. 10 is substantially as follows: It will be assumed that the capacitor 36 is selected for parallel resonance with the reactor 37 at approximately the desired voltage on the circuit 25. When the line voltage is such as to give exact resonance between capacitor 36 and reactor 37, the voltage between the points 34 and 40 is in phase with that of the voltage of circuit 25, say vector $a$, Fig. 11. At increasing voltages this voltage vector will assume progressively changing phase positions like "$b$", "$c$", "$d$" and "$e$". At voltages below resonance, it will assume progressively changing phase positions like "$f$", "$g$" and "$h$". Vectors "$c$" and "$g$" are in quadrature with the line voltage and furnish the necessary quadrature phase voltage to the motor winding 32 to cause the motor to run in one direction or the other depending upon the energization of winding 32. This causes the voltage regulator 26 to boost or buck the line voltage in a manner well understood by those skilled in the art.

In the foregoing description of various embodiments of my invention it will be observed that the bias of the saturable inductance has been held constant or substantially constant. In the following description other embodiments of my invention are described in which the bias of the saturable inductance is varied in a manner to maintain a constant ratio between the direct current and the alternating current of the inductance.

Fig. 12 illustrates diagrammatically an elementary circuit arrangement for explaining the embodiments of my invention shown in Figs. 15 and 17 and comprises the alternating current source 10 connected to energize the biased saturable inductance 12 comprising the alternating current windings 12' and the saturating winding 13 to be energized from a rectifier 43 in accordance with the current traversing the alternating current windings of the inductance. As illustrated, the rectifier may be of the dry contact type connected for full wave rectification with the input terminals connected in series relation with the windings 12' across the source 10 and the output terminals connected to the winding 13.

Fig. 13 illustrates diagrammatically the volt-ampere characteristics of the arrangement shown in Fig. 12 with different ratios between the direct and alternating current excitation of the inductance. The curves are plotted between the voltage Eac applied to the inductance as ordinates and the current Iac through the inductance as abscissae. The curve $T_7$ is the characteristic curve when the direct current excitation is zero or negligible compared with the alternating current excitation. The curve $T_8$ is obtained when the direct current excitation is increased over that used in obtaining curve $T_7$. It will be observed that $T_8$ shows flatter alternating current saturation than $T_7$. Curve $T_9$ is intended to show the case when the direct current excitation is increased sufficiently to obtain a perfectly flat saturation zone. The ratio of the direct current excitation to alternating current excitation which gives this characteristic, differs with different magnetic materials; but, for the more important ferro-magnetic materials, this ratio is of the order of one-half to one and one-half. Curve $T_{10}$ is obtained with a still further increase in direct current excitation and is of interest by the drooping zone of its characteristic curve and susceptibilty to instability or the "jumping" phenomenon of non-linear circuits under suitable conditions.

Starting with a saturable inductance of which the alternating current characteristic is of the general shape of curve $T_7$ with zero direct current excitation, characteristic curves $T_8$, $T_9$ and $T_{10}$ can be obtained by connecting suitable capacitors in series with the inductance, without the aid of any direct current bias, but with much greater wave distortion. In accordance with my invention I employ a direct current bias partially to replace the necessary series capacitance and thereby obtain better wave shape, greater stability and in addition convenience and economy in those cases in which the circuit voltage may be too high or too low for the available capacitors.

It will be observed that in a circuit with a non-saturating inductive reactance in series relation with a biased saturable inductive reactance, flatness of saturation of the resultant characteristic curve can be accomplished by making the saturable inductive reactance sufficiently drooping, as shown by curve $T_{10}$ of Fig. 13, to compensate for the rising characteristic of the non-saturating inductive reactance, and thereby obtain a resultant characteristic curve like curve $T_9$ of Fig. 13. In this respect, then, means are disclosed whereby an inductive means may neutralize an inductive reactance.

The high degree of the flatness of saturation of curve $T_9$ lends itself admirably well to circuit voltage control. In accordance with my invention the arrangement of Fig. 12 is combined with a shunt capacitance, to make its power factor leading or lagging with small changes in circuit voltage, and with a series capacitance to adjust the slope of the characteristic curve. Applications of this embodiment of my invention to circuit control are shown in Figs. 15 and 17.

Referring again to Fig. 12, a load device 44 is connected across the biased saturable inductance 12, and the supply circuit impedance is represented by the inductances 45. Let Eo be the desired voltage to be held across the load device 44, and let the saturable inductance be designed for the characteristic curve $T_9$ which is shown in greater detail in Fig. 14. If the voltage across the load and inductance terminals should tend to rise, the inductance will draw a very heavy lagging current and cause a large regulation drop through the impedance 45 of the supply circuit, reducing the voltage across the load towards $E_0$. If the load and inductance voltage should tend to fall appreciably below $E_0$, then most of the lagging current $I_0$ normally drawn by the inductance, and producing a drop through the impedance 45, will disappear and the voltage across the load will rise approaching $E_0$. This voltage regulating characteristic of this type of saturable inductance functions just as well whether the tendency to variations in the circuit voltage is brought about by variations in the load current or by variations in the supply voltage.

In Fig. 15, I have shown the explanatory arrangement as illustrated in Fig. 12 modified in accordance with my invention. In this arrangement the source 10 is connected to energize a biased saturable inductance 12 of the type and design as illustrated in Fig. 12. A capacitor 46 is connected in series with the inductance winding 12' to adjust the slope of the characteristic curve. It is preferable to choose the series connected capacitance so that the slope of the capacitance volt-ampere curve is substantially the same as the slope of the saturable inductance curve above the knee of the saturation curve. The capacitor 47 is connected in parallel relation with the inductance 12 to change the power factor of the unit from leading to lagging or vice versa depending upon the supply voltage. For example, if the inductance 12 is shunted by the capacitor 47 so that it will draw a leading current $I_0$ at the voltage $E_0$ the resultant characteristic curve will be shifted to the left (towards leading current) as shown in Fig. 16, crossing the voltage axis at $E_0$. At normal voltage, $E_0$, the combination of inductance and capacitance will draw from the supply circuit no current other than unavoidable harmonics and power losses. A tendency of the load voltage to rise above $E_0$ will cause the combination to draw a relatively large lagging current, thereby tending to lower the voltage across the load. On the other hand, a tendency in the load voltage to drop below $E_0$ will cause the combination to draw a relatively large leading current from the circuit, thereby tending to raise the voltage through the inductive impedance of the circuit.

Fig. 17 shows the circuit arrangement illustrated in Fig. 15 slightly modified to obtain a constant reference voltage $E_0$ over a wide range of supply voltage across a feeder. This modification consists of the introduction of the inductance 48 in series with the feeder lines to be regulated by the saturable inductance 12. The range of supply voltage over which the arrangement can maintain a constant reference voltage can be greatly increased if the inductance 48 is a saturable inductance of the type illustrated in Fig. 1 and designed to have a characteristic curve as illustrated by curve R in Fig. 3 operating on its steeply rising portion. In operation the arrangement functions to hold the voltage $E_0$ substantially constant similarly to the arrangements illustrated in Figs. 12 and 15, but the special characteristics of the inductance 48 operated over the critical region specified produces greater sensitivity and accuracy of control.

While I have shown and described a number of embodiments of my invention it will be obvious to those skilled in the art that various changes and modifications may be made without departing from my invention in its broader aspects, and I therefore aim in the appended claims to cover all such changes and modifications as fall within the true spirit and scope of my invention.

What I claim as new and desire to secure by Letters Patent of the United States is:

1. In combination, an alternating current circuit including a reactive current device comprising a capacitance element connected in circuit with an inductance element having a magnetic core, said elements being so correlated in accordance with the respective volt-ampere characteristics thereof as to exhibit a total non-linear volt-ampere characteristic, and means for controlling the magnetic density of said core, the magnetic density of said core being of a value substantially to reduce wave distortion in said alternating current circuit.

2. In combination, an alternating current circuit including a capacitance and a saturable inductance comprising a magnetic core and an alternating current winding connected in circuit with said capacitance, and a circuit for establishing a unidirectional flux in said core, the unidirectional flux of said core being of a value magnetically to bias said inductance to minimize wave distortion in said alternating current circuit.

3. In combination, an alternating current circuit, a compound reactive current device connected to said circuit and comprising a capacitive element and a biased inductive reactive current element so correlated as to the respective volt-ampere characteristics of said elements as to provide a total volt-ampere characteristic for said device having the properties of a capacitance for a predetermined range of voltages applied to said device and an inductance for a different predetermined range of voltages applied to said device.

4. A compound reactive current device comprising a capacitor element and a biased saturable reactor element being connected in series relation and so correlated as to the respective volt-ampere characteristics of said elements as to provide a total volt-ampere characteristic having the properties of a capacitance for a predetermined range of voltages and an inductance for a different predetermined range of voltages.

5. A compound reactive current device comprising a capacitor element and a biased saturable reactor element connected in parallel relation and so correlated as to the respective volt-ampere characteristics of said elements as to provide a total volt-ampere characteristic having the properties of a capacitance for a predetermined range of voltages and an inductance for a different predetermined range of voltages.

6. In an electric circuit, a reactive current device comprising capacitive and biased inductive reactive current elements in combination, each of said elements having a volt-ampere characteristic such that the current to said device leads the voltage across said device and varies non-linearly to exhibit a steady state saturating capacitance volt-ampere characteristic simultaneously for varying applied voltage between predetermined limits.

7. In an electric circuit, a reactive current device comprising a biased saturable reactor and a capacitor connected in parallel relation in said circuit, each of said elements having a volt-ampere characteristic such that the current to said device leads the voltage across said device and varies non-linearly to exhibit a steady state saturating capacitance volt-ampere characteristic for increasing applied voltage.

8. In combination, an inductive device having a non-linear volt-ampere characteristic and a reactive current device comprising a capacitive element and a biased inductive element arranged for neutralizing the inductive reactance of said inductive device for the non-linear portion of its volt-ampere characteristic.

9. In combination, a saturating reactor, and a saturating capacitance in series relation therewith comprising a capacitor and a biased saturable reactor connected in parallel relation.

10. In combination, a saturating reactor, and a saturating capacitance in parallel relation therewith comprising a capacitor and a biased saturable reactor connected in parallel relation.

11. In combination, a current transformer, an electric burden connected to said transformer, and a reactive current device connected to said transformer and comprising capacitive and inductive elements in combination, each of said elements having a volt-ampere characteristic such that power factor of said device is leading and exhibits saturation simultaneously for variation in applied voltage.

12. In combination, a current transformer, a power consuming device connected to said transformer, and a saturating capacitance in parallel relation to said power consuming device and comprising a capacitor and a biased saturable reactor connected in parallel relation.

13. In combination, an alternating current circuit, a reactive current device comprising a capacitive element and a biased inductive reactive current element in combination in said circuit, each of said elements having a volt-ampere characteristic such that the power factor of said circuit is leading for total current and lagging for increments of current.

14. In an electric circuit, a reactive current device comprising a capacitor and a biased saturable reactor connected in parallel relation, each of said elements having a volt-ampere characteristic such that the power factor of said circuit is leading for total current and lagging for increments of current.

15. In an electric circuit, a reactive current device comprising capacitive and biased inductive reactive current elements in combination, each of said elements having a volt-ampere characteristic such that a plurality of different voltage values of said circuit correspond to a single current value during a continuous change in applied voltage in the same direction.

16. In an electric circuit, a reactive current device comprising a capacitor and a biased saturable reactor connected in parallel relation, said capacitor and said reactor each having a volt-ampere characteristic such that a plurality of different voltage values of said circuit correspond to a single current value during a continuous change in applied voltage in the same direction.

17. In an electric circuit, a reactive current device comprising a capacitive element and a biased inductive reactive current element in combination, each of said elements having a volt-ampere characteristic such that a plurality of different current values of said circuit correspond to a single voltage value during a continuous change in applied voltage in the same direction.

18. In an electric circuit, a reactive current device comprising a capacitor and a biased saturable reactor connected in series relation, said capacitor and said reactor each having a volt-ampere characteristic such that a plurality of different current values of said circuit correspond to a single voltage value during a continuous change in applied voltage in the same direction.

19. In combination, a phase shifting network comprising a mid-tap reactor, a resistor and a parallel connected capacitor and saturable reactor, connected in the form of a bridge circuit, and a source of voltage connected to energize said bridge at alternate junction points therein, said capacitor and saturable reactor each having a volt-ampere characteristic such that a voltage component across the remaining junction points of said bridge circuit varies oppositely in phase with said applied voltage depending upon whether said applied voltage is above or below a predetermined value.

20. In an alternating current circuit, a saturable reactor having a magnetic core, direct current means for independently controlling the flux density of said core, a capacitance in series circuit with said reactor for determining the slope of its volt-ampere characteristic, and a second capacitance connected in parallel relation with a circuit including said reactor for selectively determining the power factor of the combined circuit in accordance with the voltage applied thereto.

21. In an alternating current circuit, a saturable reactor having a magnetic core, direct current means for independently controlling the flux density of said core to maintain a constant ratio between the alternating current excitation and the direct current excitation, a capacitance in series relation with said reactor, a second capacitance connected in parallel relation with a circuit including said reactor, and an impedance element connected in circuit with said reactor to be traversed by the combined current of said reactor and capacitance elements.

22. In combination, a source of variable alternating voltage, a saturable reactor having an alternating current winding and a magnetic core, a second winding on said core for independently controlling the flux density of said core, a rectifier having its input terminals connected in series relation with said reactor and its output terminals connected to energize said second winding, a capacitance connected in series relation with said reactor, a second capacitance connected in parallel relation with said reactor and said capacitance, and a reactor connected in series relation with said saturable reactor and capacitance elements and arranged to provide a steeply rising volt-ampere characteristic for its normal range of operation whereby a substantially constant branch voltage exists across said saturable reactor and series connected capacitance irrespective of variations in the voltage of said source of alternating voltage.

ARAM BOYAJIAN.